Jan. 2, 1951 W. W. RABIN 2,536,220
APPARATUS FOR STUNNING AND KILLING POULTRY
Filed Dec. 23, 1949 2 Sheets-Sheet 1
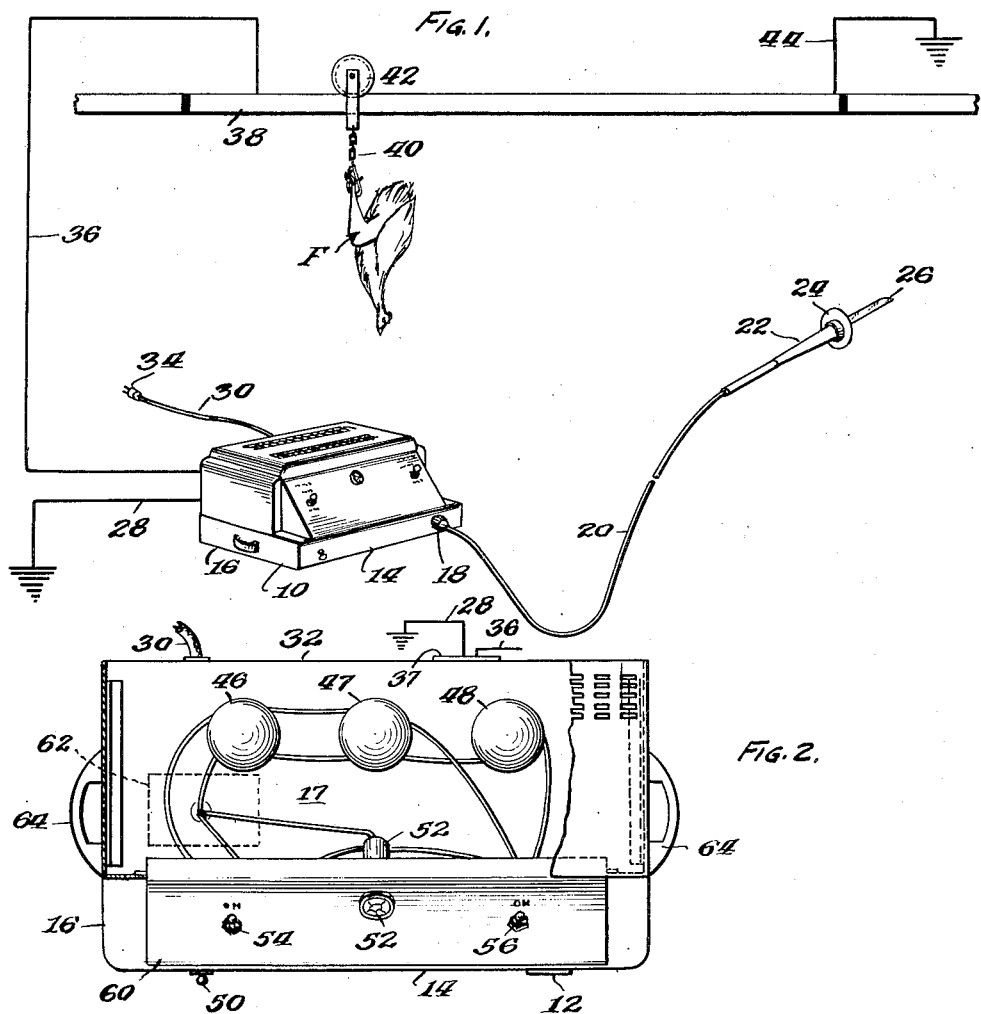
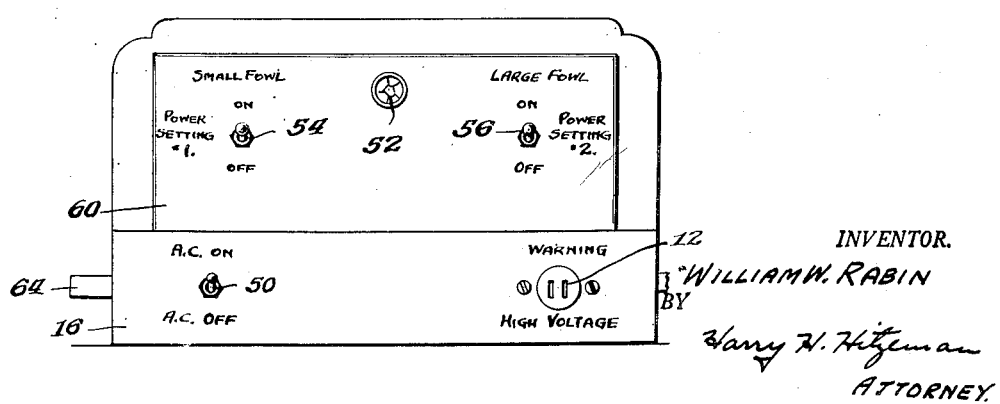
INVENTOR.
WILLIAM W. RABIN
BY Harry H. Hitzeman
ATTORNEY.

Jan. 2, 1951 W. W. RABIN 2,536,220
APPARATUS FOR STUNNING AND KILLING POULTRY
Filed Dec. 23, 1949 2 Sheets-Sheet 2
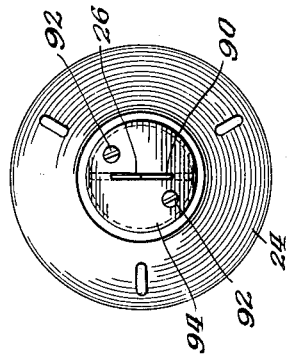
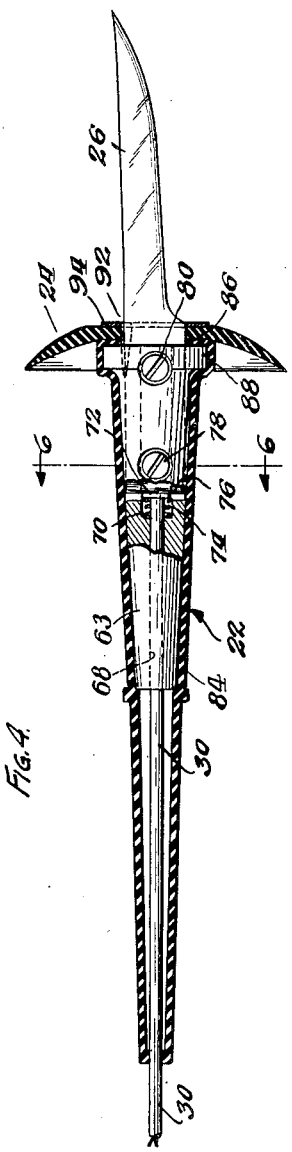
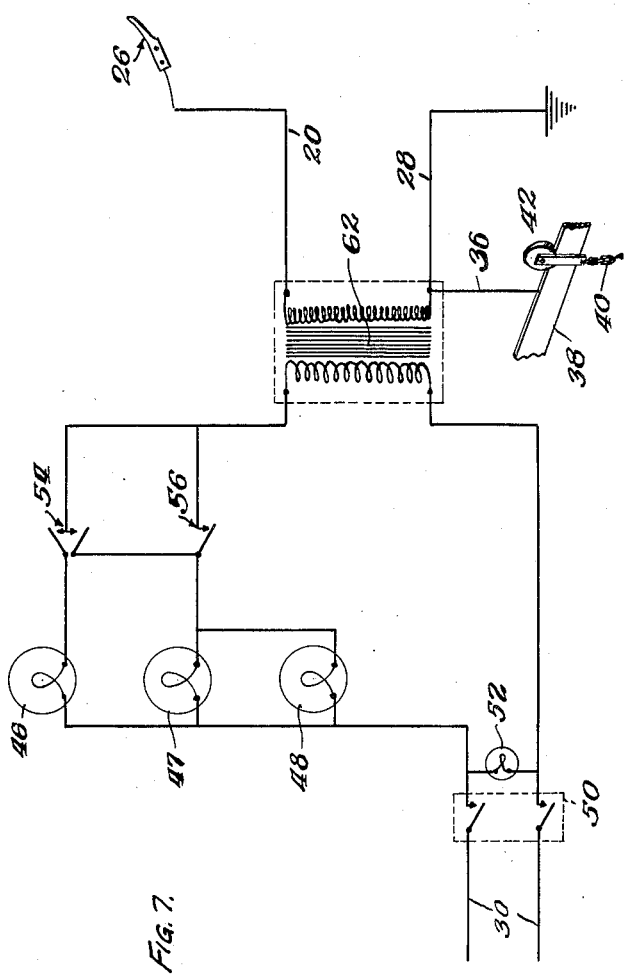
INVENTOR.
WILLIAM W. RABIN
BY
Harry H. Hitzeman
ATTORNEY.

Patented Jan. 2, 1951

2,536,220

UNITED STATES PATENT OFFICE 2,536,220

APPARATUS FOR STUNNING AND KILLING POULTRY

William W. Rabin, Chicago, Ill., assignor to Kent Equipment Co., Chicago, Ill., a corporation of Illinois Application December 23, 1949, Serial No. 134,679

6 Claims. (Cl. 17—11)

My invention relates to improvements in the method of killing poultry and improved apparatus for carrying out said method.

It has been realized in the past that in killing chickens, turkeys and other fowl, after the jugular vein has been cut and the fowl is bleeding, beating of the wings and kicking of the legs have a tendency to bruise and lacerate the bird, with the result that it is frequently unsightly in appearance, and while not particularly damaged or injured, yet it is frequently difficult to dispose of such fowl except at a reduced price.

The use of electricity to shock or stun the fowl during the bleeding time has been attempted in the past without too much commercial success. While the advantages of such stunning and killing have been realized for a long time in the industry, no satisfactory equipment or methods have previously been devised.

Accordingly, the principal object of the present invention is to provide an improved method of killing poultry or other small animals.

A further object of the invention is to provide an improved apparatus for electrically shocking or stunning fowl or other animals in connection with the killing of the same.

A further object of the invention is to provide an improved apparatus of the type described which is comparatively safe to use when used according to the directions, which is easily installed for use, and which can be used for long and continuous periods without becoming broken or out of order.

A further object of the invention is to provide an improved apparatus of the type described which may be adjusted to compensate for different size birds or animals, for the type of food they have eaten, and other factors which may be important in determining the amount of current required to properly stun the particular birds or animals.

A further object of the invention is to provide improved equipment of the type described including an improved construction of killing and stunning knife.

A further object of the invention is to provide an improved construction of killing and stunning knife which is so designed that it can be placed about without any particular care as to its position, and the knife will not discharge current therethrough or become broken or otherwise disabled.

Other objects and advantages will be more apparent from the following description wherein reference is had to the accompanying two sheets of drawings, upon which Fig. 1 is a generally diagrammatic view of a typical installation of my improved apparatus by which the process to which it relates can be carried out;

Fig. 2 is a plan view of the electrical unit which I employ in connection with my improved apparatus, the cover being broken away in parts to more clearly show other parts;

Fig. 3 is a front view thereof;

Fig. 4 is a longitudinal sectional view of the improved knife which I employ with parts of the handle broken away in section to more clearly show other parts;

Fig. 5 is a front elevational view thereof;

Fig. 6 is a cross-sectional view taken on the line 6—6 of Fig. 4; and

Fig. 7 is an electrical diagram showing the circuit which I employ.

In the embodiment of the invention which I have chosen to illustrate and describe the same, the apparatus more generally includes a housing 10 in which the principal units of the circuit are located, the housing having plug outlet 12 on the front 14 of the base 16 adapted to receive the connector 18 of an electric cord 20 which has the insulated handle 22, the shield 24 and the knife blade 26 connected thereto. The housing 10 also has a lead 28 extending therefrom provided with a clamp (not shown) by which the same can be effectively connected to ground such as a water pipe or other similar unit.

A conductor 30 may also extend from the back 32 of the housing 10 and be provided with a suitable plug 34 to engage in the socket of any usual 110-volt line circuit.

A second ground wire 36 may also extend from the terminal 37 on the back of the housing and be connected to the metallic rail 38 of the usual conveyor system in poultry houses. This normally includes in addition to the rail 38 shackle units 40 to which the feet of a fowl F are connected, the shackle normally having rollers 42 which operate on the rail 38. A suitable ground conductor 44 may extend from the rail or conveyor system.

The housing unit which I employ may house the essential units shown in the wiring diagram in Fig. 7, including suitable sockets for a plurality of electric light bulbs 46, 47 and 48, the double pole off-and-on switch 50, a pilot light 52 in the circuit, and the No. 1 and No. 2 power setting switches 54 and 56. Suitable indicia is provided upon the front 14 of the base 10 and upon an angularly disposed panel 60 on which the switches 54 and 56 are mounted, to indicate both the location of the various switches, the condition of the same and the purpose for which they are present. The signal or pilot light 52 is also mounted medially of the front panel 60 for easy observation, the step-up transformer 62 being located within the base 16 below the floor 17 of the panel 19. A pair of carrying handles 64 are provided upon the sides of the housing for convenience in handling.

The construction of the knife which I have provided may include (see Figs. 4, 5 and 6) a tapered wooden handle 63 having a medial slot 66 through a portion of the length of the same, a reduced axial bore 68 to receive the conductor 30 and an enlarged axial bore 70 within which the metal cap 72 and compression spring 74 are mounted, the cap normally making contact with the back edge 76 of the knife blade 26.

The blade is rigidly held in position in the slot 66 in the wooden handle by means of a pair of screw fasteners 78 and 80 each of which screw-threadedly engage a nut member 81 having a shank 82 extending through a suitable opening in the rear portion of the blade.

I provide a rubber sheath 84 for the wooden handle, the sheath having an opening 86 capable of stretching to be pulled over the edge 88 of the handle 64 to effectively hold the sheath in position.

The disc-shaped shield 24 which I provide is also made of rubber or other insulating material and has a medial slot 90 therein to receive the knife blade and is fastened against the edge of the wooden handle by means of screw members 92 which pass through washer 94 and engage in the end of the wooden handle.

With the above construction of knife it can be seen that the electrical connection to the blade 26 is made by means of the metal cap 72 attached to the end of the wires in the electrical conductor 30. The cap 72 pressed by the spring 70 is normally urged against the back edge of the knife blade, thus effecting at all times a good connection between the source of current and the knife blade, the connection being free of solder or other permanent fastening means, however. When it is desired to remove the blade and replace the same, it is a simple matter to remove the screw fasteners 78, pull the knife out of the slot 66, and replace with another. The shield 24 is also removable and replaceable by removing the washer 94 and screw members 92.

With this construction of knife it can be seen that when the unit is operating the knife may be laid down whenever desired by the operator, and due to the rubber sheath for the handle 22 and the shield 24 adjacent the blade, it is obvious that the blade will never touch the surface upon which the knife is laid, thus preventing short-circuiting or passing the current from the knife blade through undesired elements.

From the above and foregoing description it can be seen that I have provided a highly efficient apparatus and method of stunning and killing poultry. By the use of the comparatively simple circuit which I employ and the placement thereof in a portable unit such as that shown, it can be seen that it is a simple matter to both set up and use the equipment provided.

By the use of lamps in the primary circuit to automatically control the flow of current to the knife, it can be seen that it is a simple matter to secure a variation in the amount of current required, if desired. While it has been found by actual test that three 60-watt lamps in the equipment will cover a sufficient range in current to handle most any situation in the killing of fowl from small pullets to large turkeys, yet any circumstances requiring any variations from these limits can readily be met by changing either one or all three lamps, using either 25-watt, 40-watt, 50-watt, 60-watt, 75-watt or 100-watt, or any combination of these lamps.

The simplicity of operation of this equipment will be evident from the fact that no rheostats, resistor bank or other manually operable controls are necessary, and no meters or other indicators are required to be watched during operation, allowing the operator to concentrate on the job at hand.

While I have illustrated and described a specific embodiment of the invention, it will be apparent to those skilled in the art that changes and modifications may be made in the exact details shown, and I do not wish to be limited in any particular; rather what I desire to secure and protect by Letters Patent of the United States is:

1. A poultry killing knife adapted for connection to an electrical circuit including a wooden handle, said handle being tapered and having a slot therethrough at its front end, a knife blade, the back end of said knife fastened in said slot, said handle having an axial bore therethrough and an electric conductor therein having a metal cap at its end and spring means for holding the same in contact with the back edge of said knife.

2. A poultry killing knife adapted for connection to an electric circuit comprising a wooden handle, a knife blade extending forwardly therefrom, a soft rubber hand guard at the forward end of said handle, said hand guard being generally circular in shape and extending to a point beyond the sides of said knife blade to such degree that when said knife is placed in any reclining position the blade will be spaced from the surface upon which the knife is placed, said wooden handle having a tapered shank and an enlarged shoulder at its front end, said handle having an axial bore therethrough to receive an electric conductor, a metal cap on the forward end of said conductor, said knife blade having its back end fastened in a slot in said handle and in contact with said metal cap, and spring means in said axial bore urging said metal cap into contact with the back end of said knife blade.

3. A poultry killing knife adapted for connection to an electric circuit including a wooden handle therefor, said handle being tapered and having a slot therethrough at its front end, a knife blade having its back end fastened in said slot, said handle having an axial bore therein communicating with said slot, an electric conductor extended through said bore, said conductor having a metal cap at its end, a coiled spring mounted in a counterbore in said handle surrounding said conductor and engaging said cap for frictionally holding said cap in contact with the back edge of said knife, a soft rubber hand guard fastened to the forward end of said handle, said hand guard being generally circular in shape and extending to a point beyond the sides of the knife blade to such degree that when said knife is placed in any reclining position the blade will be spaced from the surface upon which the knife is placed, said wooden handle having a rubber sheath covering the same.

4. A fowl sticking and paralyzing device comprising an elongated metallic element terminating at one end in a sticking point, an insulating handle fixed to the opposite end of said element and having an electrical conductor extending therethrough in conectible relation to said element, means flexibly connecting said conductor with a source of electricity, said element and handle being easily manipulatable as a unit, said handle being provided with a slot extending back from the front of the same, said metallic element secured in said slot, an axial bore communicating with said slot, an enlarged counterbore adjacent said slot, said electrical conductor extending through said axial bore, a metal cap member secured to the end of the same, a compression spring positioned around said cap member in said counterbore and yieldingly forcing said cap member against the back edge of said metallic element to make electrical contact with the same.

5. An electric knife comprising a handle having a bore extending longitudinally therein from one end thereof, said handle having a counterbore communicating with the first mentioned bore and also having a slot extending through said counterbore from its other end to a point adjacent said first mentioned bore, a knife blade having a shank disposed in said slot, screw means through said shank holding said blade connected to said handle and an electric conductor connected to said shank and extending through said bore, a metal cap at the end of said conductor and a coiled spring encircling the same and disposed in said counterbore for frictionally holding said cap in contact with the shank of said knife.

6. The combination of claim 1 in which the said electrical circuit includes a plurality of resistors in the form of standard electric light bulbs.

WILLIAM W. RABIN.

REFERENCES CITED

The following references are of record in the file of this patent:

UNITED STATES PATENTS

| Number | Name | Date |
| --- | --- | --- |
| 2,103,288 | Hunt | Dec. 28, 1937 |
| 2,129,968 | Sargent et al. | Sept. 13, 1938 |
| 2,245,880 | Tipton et al. | June 17, 1941 |
| 2,512,089 | Cervin | June 20, 1950 |